(12) United States Patent
Hwang et al.

(10) Patent No.: US 12,674,631 B2
(45) Date of Patent: Jul. 7, 2026

(54) RADIATOR SUPPORT COVER AND RADIATOR INCLUDING THE SAME

(71) Applicants:HYUNDAI MOTOR COMPANY, Seoul (KR); KIA CORPORATION, Seoul (KR); HANON SYSTEMS, Daejeon (KR)

(72) Inventors: Young Kook Hwang, Daejeon (KR); Hyuk Kim, Daejeon (KR); Jong Myeong Lee, Gunpo-si (KR); Nam Ho Park, Suwon-si (KR)

(73) Assignees: HYUNDAI MOTOR COMPANY, Seoul (KR); KIA CORPORATION, Seoul (KR); HANON SYSTEMS, Daejeon (KR)

( * ) Notice: Subject to any disclaimer, the term of this patent is extended or adjusted under 35 U.S.C. 154(b) by 133 days.

(21) Appl. No.: 18/644,919

(22) Filed: Apr. 24, 2024

(65) Prior Publication Data

US 2024/0384944 A1 Nov. 21, 2024

(30) Foreign Application Priority Data

May 17, 2023 (KR) ........................ 10-2023-0063540

(51) Int. Cl.
| | |
|---|---|
| *F28F 9/007* | (2006.01) |
| *B62D 25/08* | (2006.01) |
| *F28F 9/00* | (2006.01) |

(52) U.S. Cl.
CPC ........... *F28F 9/007* (2013.01); *B62D 25/084* (2013.01); *F28F 9/002* (2013.01); *F28F 2275/085* (2013.01)

(58) Field of Classification Search
CPC ...... F28F 9/007; F28F 9/002; F28F 2275/085; B62D 25/084
See application file for complete search history.

(56) References Cited

U.S. PATENT DOCUMENTS

| | | | | |
|---|---|---|---|---|
| 5,522,457 | A * | 6/1996 | Lenz | F28D 1/024 |
| | | | | 180/68.1 |
| 5,704,418 | A * | 1/1998 | Baader | F28F 9/002 |
| | | | | 165/DIG. 311 |
| 2001/0047860 | A1* | 12/2001 | Martins | F28F 1/32 |
| | | | | 165/149 |

(Continued)

FOREIGN PATENT DOCUMENTS

| | | | | |
|---|---|---|---|---|
| KR | 20120097618 A | | 9/2012 | |
| KR | 20210111535 A | * | 9/2021 | .............. F01P 11/10 |
| WO | WO-2021006493 A1 | * | 1/2021 | .............. B60K 11/04 |

OTHER PUBLICATIONS

Translation of KR20210111535A named TRANSLATION-KR20210111535A (Year: 2021).*

(Continued)

*Primary Examiner* — Paul Alvare
(74) *Attorney, Agent, or Firm* — Lempia Summerfield Katz LLC

(57) ABSTRACT

A heat exchanger includes a heat exchanger main body having a pair of header tanks configured to deliver a cooling medium, a core part disposed between the pair of header tanks and configured to allow heat exchange with the cooling medium, and a support disposed at a lateral side of the core part, and a support cover coupled to the support and configured to cover at least a part of the support.

12 Claims, 11 Drawing Sheets

(56) References Cited

U.S. PATENT DOCUMENTS

| | | | |
|---|---|---|---|
| 2008/0308333 A1* | 12/2008 | Kapadia | B60R 19/12 |
| | | | 293/115 |
| 2018/0304945 A1* | 10/2018 | Hickey | B62D 65/024 |
| 2024/0384944 A1* | 11/2024 | Hwang | F28F 9/007 |

OTHER PUBLICATIONS

Translation of WO2021006493A1 named TRANSLATION-
WO2021006493A1 (Year: 2021).*

* cited by examiner

10

REAR

FRONT

10

FRONT

REAR

RADIATOR SUPPORT COVER AND RADIATOR INCLUDING THE SAME

CROSS-REFERENCE TO RELATED APPLICATION

This application claims priority to and the benefit of Korean Patent Application No. 10-2023-0063540 filed in the Korean Intellectual Property Office on May 17, 2023, the entire contents of which are incorporated herein by reference.

TECHNICAL FIELD

The present disclosure relates to a radiator for a vehicle. More particularly, the present disclosure relates to a radiator and to a radiator support cover, which is applied to a radiator support to prevent an operator from being injured by a sharp surface of the support and to protect a core part of the radiator.

BACKGROUND ART

Front-end modules (FEMs), including various types of modular components, are mounted at a front end of a vehicle.

Various types of heat exchangers, e.g., an auxiliary radiator, may be mounted in the front-end module in order to reuse thermal energy and/or raise or lower temperatures to suit a desired application.

The auxiliary radiator may be mounted separately from and in addition to a main radiator to improve cooling performance of a coolant that cools an internal combustion engine. Alternatively, the auxiliary radiator may be provided separately from a main radiator to cool a coolant that cools electrical components of an environmental-friendly vehicle.

The auxiliary radiator is assembled in or coupled to the FEM and thus mounted in the vehicle. After the auxiliary radiator has been mounted, a connector mounting process is performed at a location rearward of or behind the auxiliary radiator.

In general, an auxiliary radiator mounted in a vehicle is positioned forward of or in front of a front wheel or wheels of the vehicle. Accordingly, an operator needs to put his or her hand(s) into a space between the auxiliary radiator and a front wheel cover to perform the connector mounting process.

However, in this case, there is a problem in that it is difficult to perform the connector mounting process because a gap between the auxiliary radiator and surrounding objects is very narrow. Further, there is also a problem in that the operator maybe injured by a sharp support surface of the auxiliary radiator during the connector mounting process.

SUMMARY

The present disclosure has been made in an effort to provide a support cover, which is applied to a radiator support to prevent an operator from being injured by a sharp support surface and to improve protection of a core part of the radiator. The present disclosure also provides a radiator including the same.

An example of the present disclosure provides a heat exchanger including a heat exchanger main body having a pair of header tanks configured to deliver a cooling medium, a core part disposed between the pair of header tanks and configured to allow heat exchange with the cooling medium, and a support installed at a lateral side of the core part. The heat exchanger also includes a support cover coupled to the support and configured to cover at least a part of the support.

The support cover may include a body configured to cover a side facing surface of the support and a blade protruding from the body and configured to cover a forward or rearward edge surface of the support.

The blade may be provided on one of two opposite surfaces of the body in a width direction and configured to cover a rearward edge of the support.

A predetermined mark may be formed on the body to identify an assembling direction of the support cover.

The body may be longer in length than the support or larger in width than the support.

Female-male coupling structures may be respectively provided on the support and the support cover. The support and the support cover may be coupled to each other by the female-male coupling structures.

At least one catching ring may be formed on the support. A ring fastening portion may be formed on the body and positioned at a position corresponding to the catching ring. The catching ring of the support may be fitted with the ring fastening portion of the body.

The support may have a structure in which a central portion, except for an outer peripheral portion, is recessed toward the core part. The catching ring may be formed between the outer peripheral portion of the support and an inclined surface of the central portion.

The body may have a through-hole formed through the body and positioned at a position corresponding to the ring fastening portion.

The body may have one or more guide ribs for guiding attachment of the support cover, and the guide ribs may protrude from a surface of the body.

The guide ribs may include first guide ribs disposed at an elevation that is the same as an elevation of a through-hole formed through the body and may include a second guide rib disposed between the plurality of first guide ribs spaced apart from one another in a vertical direction.

The support cover may be provided only on one of two opposite surfaces of the core part.

One of the two opposite surfaces of the core part, on which the support cover is installed, may be an outer side of the core part closest to a side of a vehicle.

At least a part of the support may be configured to be covered by an air guide installed on the heat exchanger main body. The air guide may be installed at a side of the core part in the width direction that is not a side at which the support cover is mounted.

The heat exchanger main body may be an auxiliary radiator installed separately from a cooling module installed at a front side of a vehicle.

BRIEF DESCRIPTION OF THE DRAWINGS

FIG. 10 is an enlarged view of a catching ring of a support in FIG. 9.

DETAILED DESCRIPTION

Figure 1:
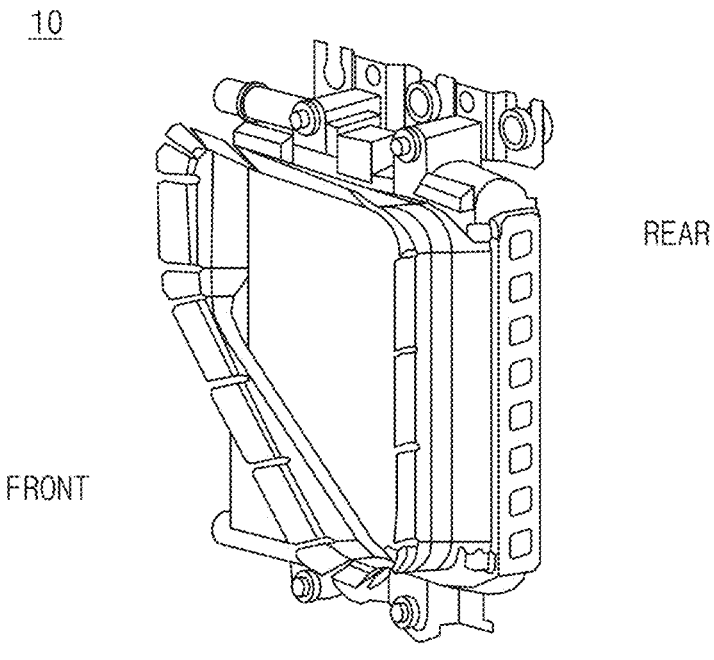
FIG. 1 is a front perspective view of a heat exchanger according to an example of the present disclosure.

Hereinafter, embodiments of the present disclosure are described in detail with reference to the accompanying drawings.

However, the inventive concept or technical spirit of the present disclosure is not limited to the embodiments described herein, but instead may be implemented in various different forms. One or more of the constituent elements in the embodiments of the present disclosure may be selectively combined and/or substituted for use within the scope of the technical spirit of the present disclosure.

In addition, unless otherwise specifically and explicitly defined and stated, the terms (including technical and scientific terms) used to describe the embodiments of the present disclosure should be construed as having meanings commonly understood by a person having ordinary skill in the art to which the present disclosure pertains. The meanings of commonly used terms such as terms defined in dictionaries should be interpreted in consideration of the contextual meanings of the related technology.

In addition, the terms used to describe the embodiments of the present disclosure are for describing or explaining the embodiments and are not intended to limit the present disclosure.

In the present specification, unless particularly stated otherwise, a singular form may also include a plural form. The expressions "at least one (or one or more) of A, B, and C" as well as "at least one (or one or more) of A, B, or C" may include any one of A, B, or C as well as one or more of all combinations that can be made by combining A, B, and C.

In addition, the terms such as first, second, A, B, (a), and (b) may be used to describe constituent elements of the embodiments of the present disclosure.

These terms are used only for the purpose of differentiating one constituent element from another constituent element. The nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or may be attached to another constituent element through another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element. When a component, device, element, or the like of the present disclosure is described as having a purpose or performing an operation, function, or the like, the component, device, or element should be considered herein as being "configured to" meet that purpose or perform that operation or function.

Figure 2:
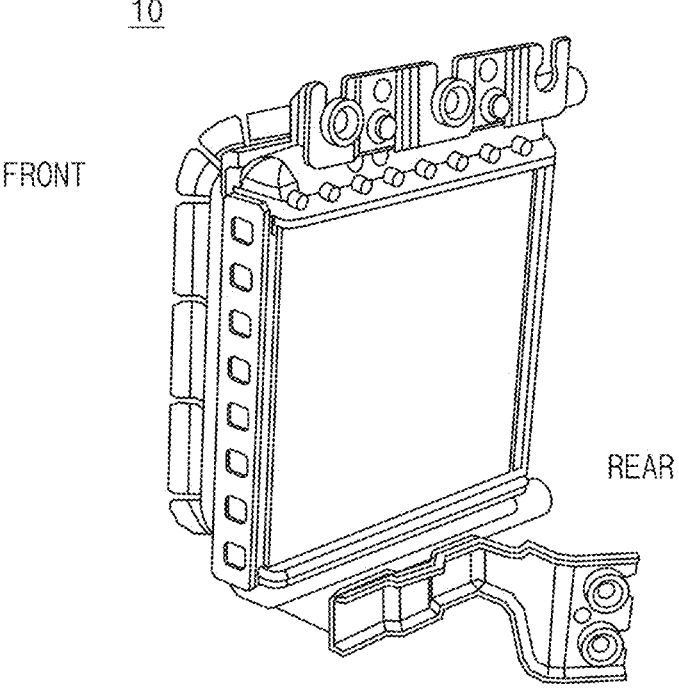
FIG. 2 is a rear perspective view of the heat exchanger of FIG. 1.
Figure 3:
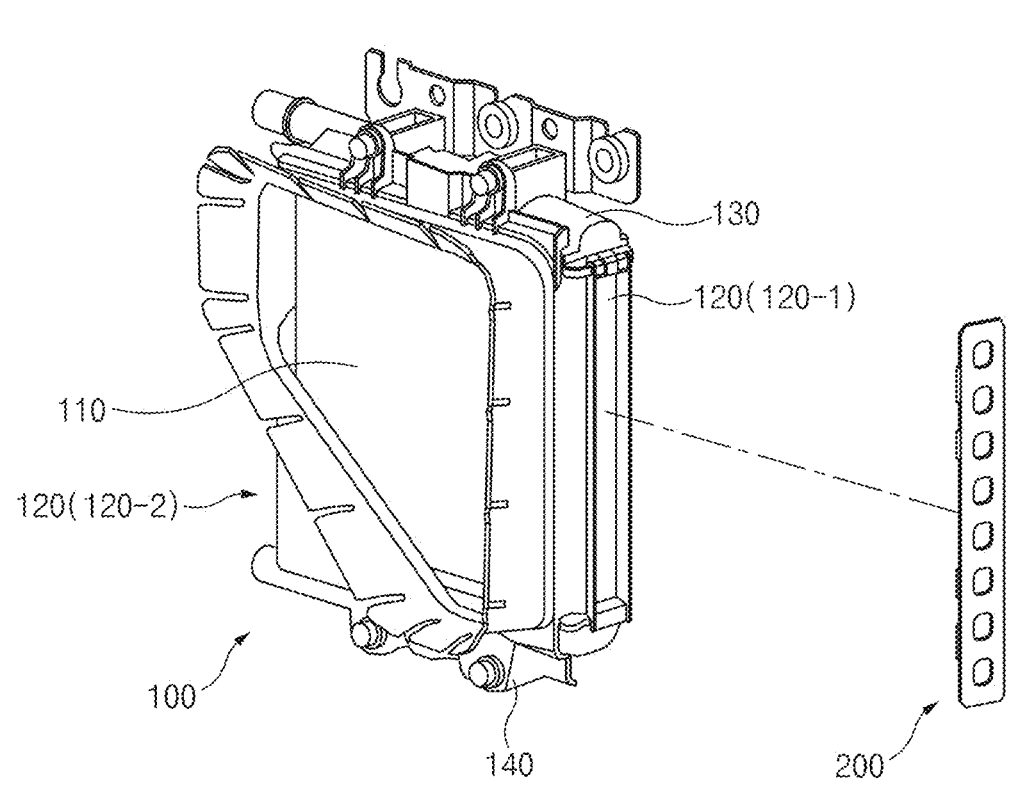
FIG. 3 is an exploded perspective view of the heat exchanger FIG. 1.

FIG. 1 is a front perspective view of a heat exchanger according to an example of the present disclosure. FIG. 2 is a rear perspective view of the heat exchanger of FIG. 1. FIG. 3 is an exploded perspective view of the heat exchanger of FIG. 1.

As illustrated in FIGS. 1-3, a heat exchanger 10 according to the present disclosure includes a heat exchanger main body 100 and a support cover 200 configured to cover a support 120 of the heat exchanger main body 100. The heat exchanger main body 100 may include a core part 110 in which a coolant, which is a cooling medium, exchanges heat with air. The heat exchanger main body 100 may also include supports 120 installed at the lateral sides of the core part 110 and configured to protect the core part 110 and may include header tanks 130 installed at the upper and lower sides of the core part 110 and configured to deliver the coolant. The core part 110 may include a plurality of tubes through which the coolant flows and may include fins interposed between the tubes. The supports 120 may be respectively installed on two opposite surfaces of the core part 110.

The support cover 200 is a cover structure configured to cover one of the supports 120 of the heat exchanger main body 100. The support cover 200 is disposed along a side of the support 120 (e.g., between a side of the support 120 and a side of the vehicle), disposed at the lateral sides of the heat exchanger main body 100, and configured to cover a side surface of the supports 120. The support cover 200 may be made of a plastic resin material.

The heat exchanger 10 or the heat exchanger main body 100 of the present disclosure may be a radiator. More specifically, the heat exchanger 10 or heat exchanger main body 100 may be an auxiliary radiator installed at a front side of a vehicle, i.e., installed in a front-end module (FEM).

The auxiliary radiator may be disposed at the front side of the vehicle and positioned to be offset from a center of the vehicle toward one side of the vehicle in a width direction of the vehicle. Thus, the auxiliary radiator may be positioned forward or in front of a front wheel of the vehicle. Therefore, the support 120, which is positioned in an outward direction (e.g., on a side of the heat exchanger main body 100 closest to a side of the vehicle) based on the vehicle among the supports 120 installed at the two opposite sides of the heat exchanger main body 100, i.e., installed at the lateral sides of the auxiliary radiator based on the outward direction based on the vehicle, may be exposed.

In this case, an interface of the support 120 between a front surface and a lateral surface of the support 120, i.e., an outer peripheral portion of the support 120 is formed to be relatively sharply. For this reason, as described above, there is a risk that the operator is injured when the operator performs a connector mounting process after mounting the auxiliary radiator to the vehicle.

According to the present disclosure, the support cover may be applied to the support and cover the sharp support surface, thereby eliminating the risk of injury. Further, the support cover may improve protection of the core part of the radiator from impact or debris from the outside.

The support cover 200 may be installed on only one 120-1 of the supports 120 at the two opposite sides of the heat exchanger main body 100. Specifically, the support cover 200 may be installed only on the support 120-1 disposed in the outward direction based on the vehicle (e.g., only on the support 120-1 disposed closest to a side of the vehicle). Thus, a separate support cover 200 may not be installed on the opposite support 120-2, i.e., the support 120-2 disposed in the inward direction based on the vehicle. Unlike the support 120-1 disposed in the outward direction based on the vehicle, the support 120-2 disposed in the inward direction based on the vehicle is not exposed directly to the outside, which is relatively less likely to be damaged. Further, the support 120-2 is distant from a space in which the connector mounting process is performed, making it less likely to injure an operator during the connector mounting process. Therefore, the support cover 200 may be installed only on one support 120-1 of the supports 120 disposed at the two opposite sides of the heat exchanger main body 100. Specifically, the support cover 200 may be installed only on the support 120-1 disposed in the outward direction (e.g., closest to a side of the vehicle) based on the vehicle, thereby minimizing cost and weight.

Referring to FIGS. 1-3, the support cover 200 is fixedly coupled to the support 120. In other words, in the present disclosure, an additional structure or hardware is not required to install the support cover 200 on the support 120. The support cover 200 may be coupled directly to the support 120. This may improve ease of assembly and reduce manufacturing costs. Hereinafter, the support 120 and the support cover 200 of the present disclosure are described in more detail.

Figure 4:
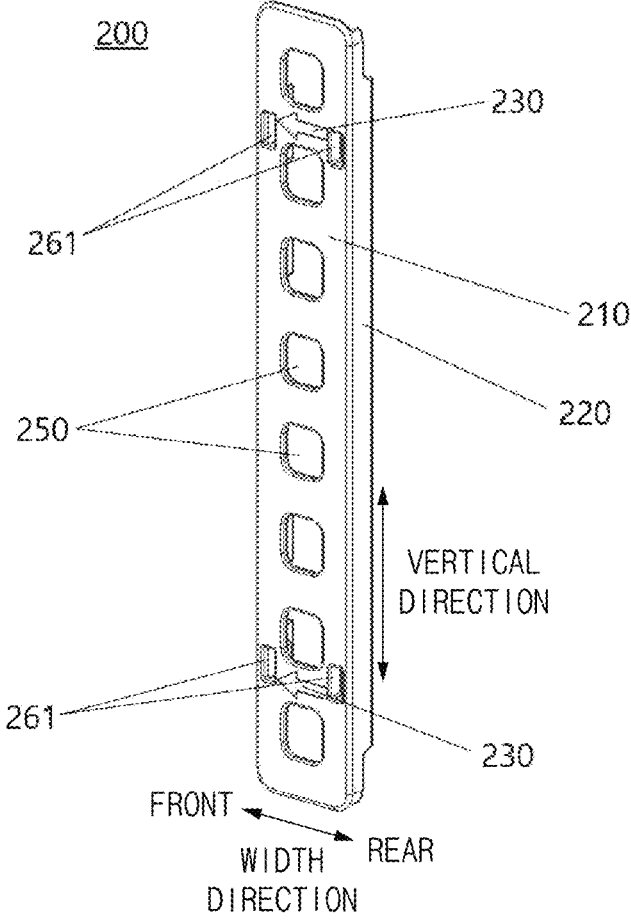
FIG. 4 is a front perspective view of a support cover according to an example of the present disclosure.
Figure 5:
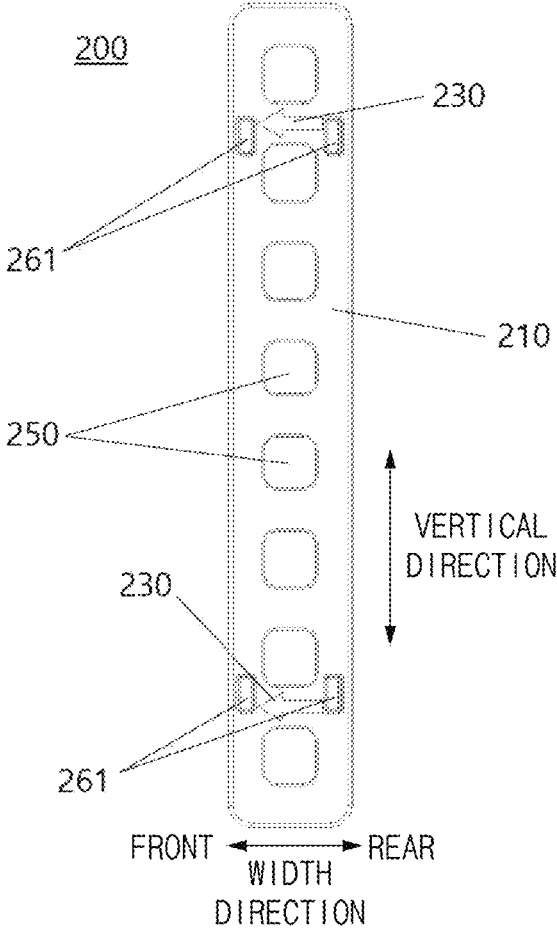
FIG. 5 is a front view of the support cover in FIG. 4.
Figure 6:
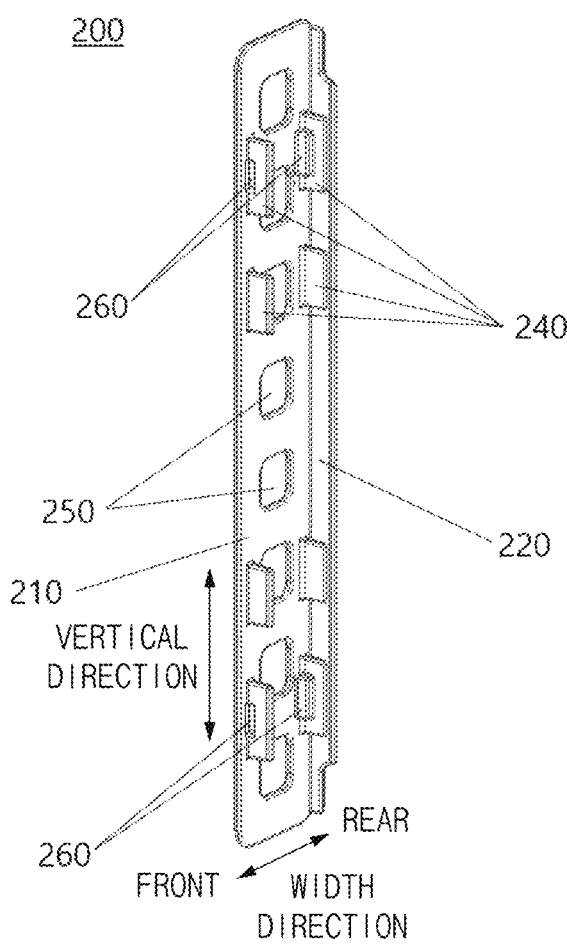
FIG. 6 is a rear perspective view of the support cover in FIG. 4.
Figure 7:
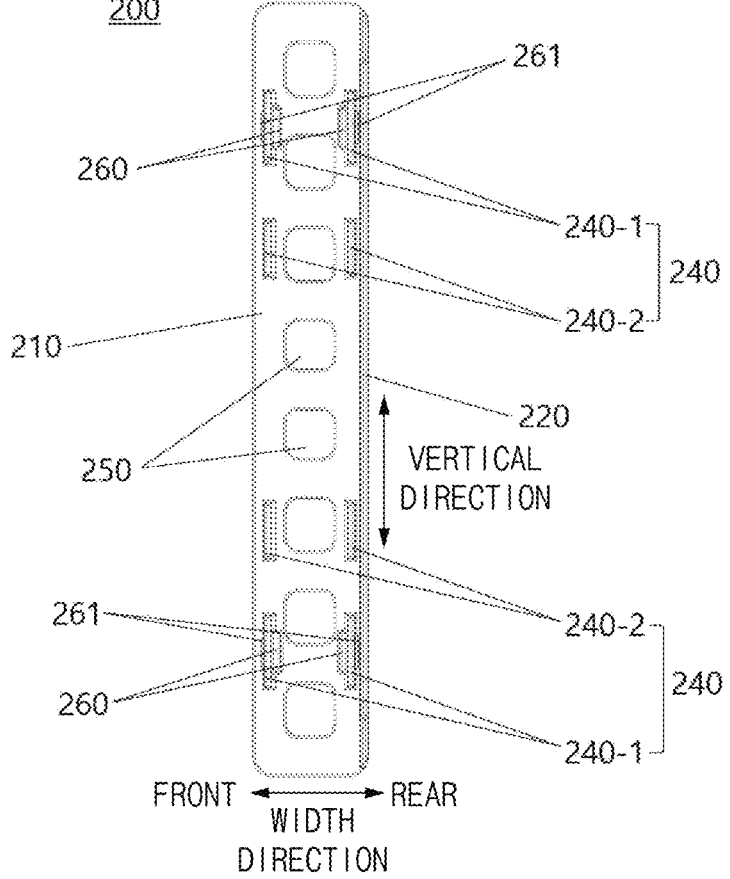
FIG. 7 is a rear view of the support cover in FIG. 4.
Figure 8:
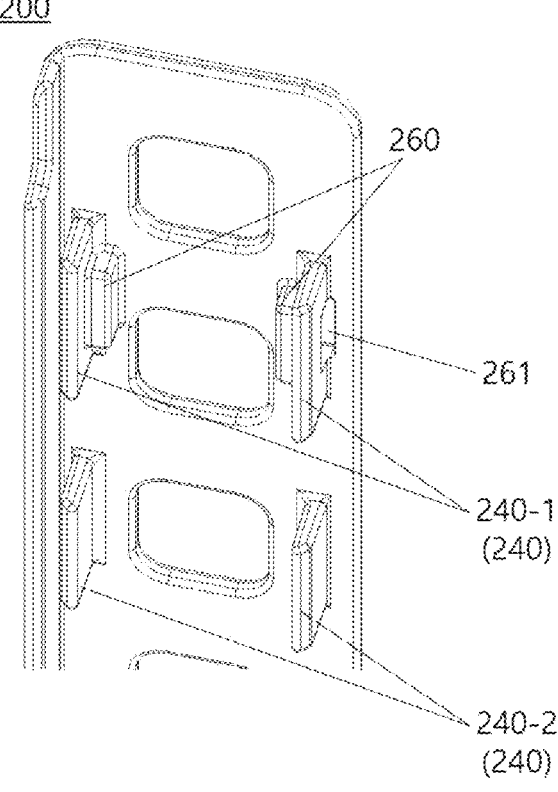
FIG. 8 is an enlarged view of a rear surface of the support cover in FIG. 4.

FIG. 4 is a front perspective view of the support cover according to the example of the present disclosure. FIG. 5 is a front view of the support cover in FIG. 4. FIG. 6 is a rear perspective view of the support cover in FIG. 4. FIG. 7 is a rear view of the support cover in FIG. 4. FIG. 8 is an enlarged view of a rear surface of the support cover in FIG. 4.

As illustrated, the support cover 200 includes a body 210 and a blade 220.

The body 210 is provided in the form of a long board and configured to cover an exposed lateral outward or side facing surface of the support 120. In other words, a back side of the body 210 faces the lateral outward or side facing surface of the support 120. In this case, the body 210 may be formed to be longer in length than the support 120 in an upward/downward (e.g., vertical) direction to cover the upper and lower portions or top and bottom edges of the support 120. The body 210 may be formed to be larger or longer in width than the support 120 to cover two opposite side portions or forward and rearward edges of the support 120 in the width direction. Therefore, a totality of the area of the lateral outward or side facing surface of the support 120 may be covered. Further, the body 210 may be appropriately elongated to cover a joint portion of the header tank 130, such that all sharp portions of an outer surface of the heat exchanger main body 100 may be covered.

The blade 220 protrudes from a back side or side of the body 210 that faces the exposed lateral outward or side facing surface of the support 120 of the body 210 and covers a rear surface of the support 120. The blade 220 may be provided in the form of a long board and disposed to be perpendicular to the body 210. In other words, an inner surface of the blade 220 faces the (e.g., rear) outer surface of the support 120. When the blade 220 is provided as described above, the blade 220 may more assuredly cover not only the exposed lateral outward or side facing surface of the support 120 but also the sharp interface between the exposed lateral outward or side facing surface and the rear surface of the support 120.

In this case, the blade 220 may be provided on one of the two opposite surfaces of the body 210 in the width direction. Specifically, the blade 220 may be disposed on rear side of the heat exchanger main body 100 or on a front side of the heat exchanger main body 100 based on the front and rear sides of the vehicle. Therefore, the blade 220 may be configured to cover only one of the two opposite surfaces of the support 120 in the width direction, i.e., a rear side based on the heat exchanger main body 100 or based on the front and rear sides of the vehicle. In this case, the opposite side of the support 120, i.e., a front side based on the front and rear sides of the vehicle may be covered by an air guide 140 installed at a front side of the heat exchanger main body 100. As described above, the blade 220 is provided only at one side of the body 210, and at least a part of the support 120 is covered by the air guide 140, such that the weight and manufacturing costs of the support cover 200 may be reduced.

In addition, as described above, the assembling or mounting direction of the support cover 200 may be distinguished. Therefore, predetermined marks 230 may be formed on the body 210 so that the operator may identify the assembling direction of the support cover 200. For example, as illustrated in FIG. 4, arrows 230, which indicate the assembling direction, may be marked on the body 210.

Meanwhile, although not illustrated separately, the support cover 200 may have a symmetric structure in which the blades 220 are respectively provided on both of the two opposite surfaces of the body 210 based on the width direction (i.e., a front and rear surface). In this case, a separate mark for indicating the directionality may not be required. In addition, the blade 220 of the support cover 200 may be formed to correspond to the upper and lower surfaces of the body 210.

Referring to FIGS. 6 and 7, one or more guide ribs 240 are formed on the body 210. The guide rib 240 is a structure for guiding the assembling of the support cover 200. The guide rib 240 may protrude from the surface of the body 210. The guide rib 240 may be accommodated in a recessed space at a center of the support 120, which is described below, and face inclined surfaces 120P of the support 120. When the guide ribs 240 are provided on the support cover 200 as described above, the position of the support cover 200 may be more easily and accurately adjusted during the process of assembling the support cover 200.

Further, with reference back to FIGS. 4-8, a slimming part may be applied to the support cover 200, thereby minimizing the increase in costs and weight caused by the application of the support cover. More specifically, as illustrated, one or more slimming holes 250 may be formed in the body 210. In this case, the slimming hole 250 may be formed in a central portion of the body 210, except for an outer peripheral portion of the body 210 corresponding to the sharp portion of the outer portion of the support 120 or the heat exchanger 10.

Figure 9:
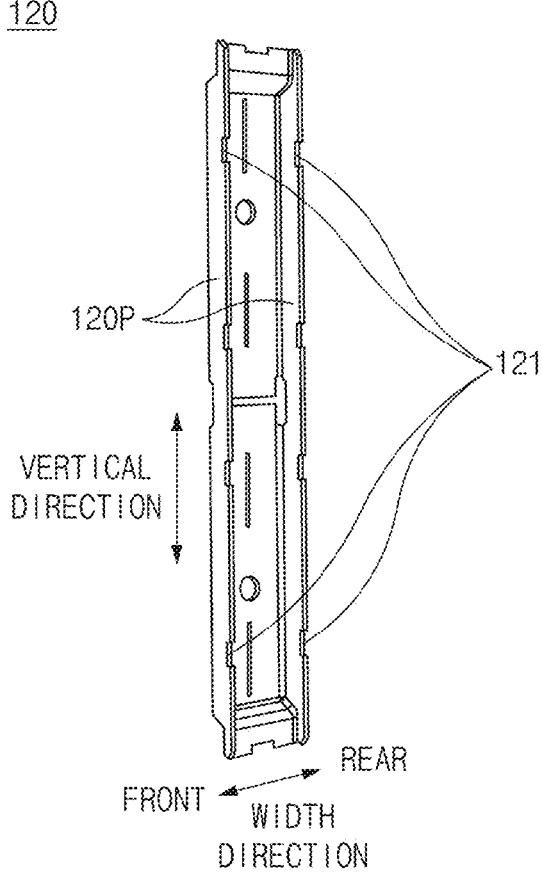
FIG. 9 is a front perspective view of a support according to an example of the present disclosure.

FIG. 9 is a front perspective view of the support according to the example of the present disclosure. The support 120 may have a structure in which a central portion, except for the outer peripheral portion of the support 120, is recessed inward, i.e., recessed toward the core part 110. In other words, the support 120 may be provided in the form of a box open at an exposed lateral outward side thereof.

Meanwhile, as described above, the support cover 200 may be coupled directly to the support 120. For example, female-male coupling structures may be respectively provided on the support 120 and the support cover 200, and the support 120 and the support cover 200 may be coupled to each other by the female-male coupling structures. In other words, any one of the female-male coupling structures may be provided on the support 120, and the other of the female-male coupling structures may be provided on the support cover 200. The female-male coupling structures may be variously configured. For example, the female-male coupling structures may be configured as hook fitting structures.

More specifically, as illustrated in FIG. 9, one or more catching rings 121 may be formed on the support 120. As illustrated in FIGS. 6-8, ring fastening portions 260, which correspond to the catching rings 121, may be formed on the body 210. The catching ring of the support 120 may be fitted with the ring fastening portion 260 of the body 210.

Figure 10:
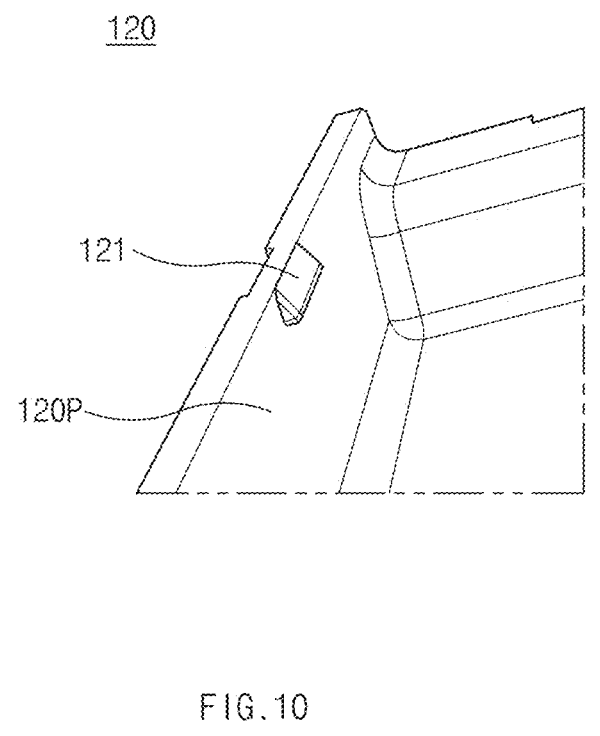

FIG. 10 is an enlarged view of the catching ring of the support in FIG. 9. As illustrated, the catching ring 121 of the support 120 may be positioned between the outer peripheral portion of the support 120 and the inclined surface 120P of the central portion and protrude toward the center of the support 120. Further, as illustrated in FIGS. 6-8, the one or more ring fastening portions 260 may be formed on the body 210 of the support cover 200 and provided at the positions corresponding to the catching rings 121 of the support 120. In this case, the ring fastening portion 260 may be configured by using the guide rib 240. For example, the ring fastening portion 260 may be configured as a catching projection structure on one surface of the guide rib 240.

More specifically, with reference to FIGS. 6-8, the plurality of guide ribs 240 are disposed in two rows in the width direction and spaced apart from one another in the upward/downward direction and the vertical direction. In this case, the guide ribs 240 may be provided as two types of guide ribs including a first guide rib 240-1 having the ring fastening portion 260 and a through-hole 261, and a second guide rib 240-2 that does not have the ring fastening portion 260 or the through-hole 261. The first guide rib 240-1 may be positioned at the same elevation as the through-hole 261. The second guide rib 240-2 may be disposed between the plurality of first guide ribs 240-1 spaced apart from one another in the vertical direction.

Figure 11:
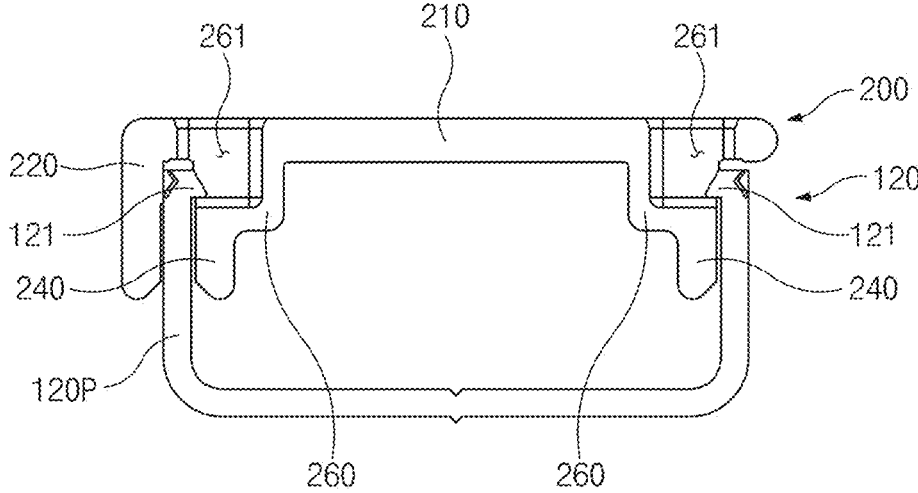
FIG. 11 is a view illustrating a cross-section of a structure in which the support cover and the support are coupled.

FIG. 11 is a view illustrating a cross-section of a structure in which the support cover and the support are coupled and illustrates a state in which the catching ring 121 of the support 120 is fitted with the ring fastening portion 260 of the body 210. As described above, the catching ring 121 and the ring fastening portion 260 are respectively provided on the support 120 and the support cover 200, such that the support cover 200 may be easily, securely, and directly fastened and fixed to the support 120 without a separate maintaining or assembling structure.

Further, with reference back to FIGS. 4-8, the through-hole 261 may be formed in the body 210, and the through-hole 261 is formed through the body 210 and corresponds to the position at which the ring fastening portion 260 is formed. Because the through-hole 261 is formed as described above, the operator may assemble the support cover 200 while observing the catching ring 121 from the front surface of the body 210 through the through-hole 261. Further, the operator may identify whether the catching ring 121 is properly fastened to the ring fastening portion 260 after the assembling process.

According to the present disclosure described above, the support cover 200 is applied to the support 120 of the heat exchanger 10 and covers the sharp support surface of the support 120, thereby preventing the operator from being injured. Further, the support cover 200 protects the support 120 once again, thereby more assuredly protecting the core part 110 of the heat exchanger 10. In addition, the support cover 200 is configured to be coupled directly to the support 120, thereby facilitating the assembling process and reducing the manufacturing costs. Further, the slimming part is applied to the support cover 200, thereby minimizing the increase in weight and costs caused by the adoption of the support cover 200.

While several embodiments of the present disclosure have been described with reference to the accompanying drawings, those of ordinary skill in the art should understand that the present disclosure may be carried out in various other specific forms without departing from the inventive concept of and without changing the technical spirit or an essential feature of the present disclosure. Therefore, it should be understood that the above-described embodiments are illustrative in all aspects and do not limit the present disclosure.

What is claimed is:

1. A heat exchanger comprising:
   a heat exchanger main body including a pair of header tanks configured to deliver a cooling medium, a core part disposed between the pair of header tanks and configured to allow heat exchange with the cooling medium, and a support disposed at a lateral side of the core part; and
   a support cover coupled to the support and configured to cover at least a part of the support,
   wherein the support cover comprises
      a body configured to cover the support, and
      a blade protruding from the body, the blade configured to cover a forward or rearward edge of the support,
   wherein at least one catching ring is formed on the support,
   wherein a ring fastening portion is formed on the body and positioned at a position corresponding to the catching ring,
   wherein the catching ring of the support is fitted with the ring fastening portion of the body, and
   wherein the body has a through-hole formed through the body and positioned at a position corresponding to the ring fastening portion.

2. The heat exchanger of claim 1, wherein the blade is provided on one of two opposite surfaces of the body in a width direction and configured to cover a rearward edge of the support.

3. The heat exchanger of claim 2, wherein a predetermined mark is formed on the body to identify an assembling direction of the support cover.

4. The heat exchanger of claim 1, wherein the body is longer in length than the support or larger in width than the support.

5. The heat exchanger of claim 1, wherein the support and the support cover are coupled to each other.

6. The heat exchanger of claim 1, wherein the support has a structure in which a central portion, except for an outer peripheral portion, is recessed toward the core part.

7. The heat exchanger of claim 1, wherein the body has one or more guide ribs for guiding attachment of the support cover, and wherein the guide ribs protrude from a surface of the body.

8. The heat exchanger of claim 7, wherein the guide ribs comprise:
   first guide ribs aligned with a through-hole formed through the body; and
   a second guide rib disposed between the plurality of first guide ribs spaced apart from one another in a vertical direction.

9. The heat exchanger of claim 1, wherein the support cover is provided only on one of two opposite surfaces of the core part.

10. The heat exchanger of claim 9, wherein one of the two opposite surfaces of the core part, on which the support cover is installed, is an outer side of the core facing a corresponding side of a vehicle.

11. The heat exchanger of claim 9, wherein at least a part of the support is configured to be covered by an air guide installed on the heat exchanger main body, and wherein the air guide is disposed at a side of the core part in the width direction that is not a side at which the support cover is mounted.

12. The heat exchanger of claim 1, wherein the heat exchanger main body is an auxiliary radiator installed separately from a cooling module disposed at a front side of a vehicle.

\* \* \* \* \*